US005300954A

United States Patent [19]

Murano et al.

[11] Patent Number: 5,300,954

[45] Date of Patent: Apr. 5, 1994

[54] OPTICAL PRINTER HEAD

[75] Inventors: Shunji Murano, Aira; Yuuji Kurazono, Kokubu, both of Japan

[73] Assignee: Kyocera Corporation, Kyoto, Japan

[21] Appl. No.: 619,874

[22] Filed: Nov. 29, 1990

[30] Foreign Application Priority Data

Nov. 30, 1989 [JP] Japan ................................ 1-312671

[51] Int. Cl.[5] ........................................ G01D 15/14

[52] U.S. Cl. ................................ 346/107 R; 346/108

[58] Field of Search ................... 346/107 R, 150, 108, 346/76 PH; 357/17

[56] References Cited

U.S. PATENT DOCUMENTS

| | | | |
|---|---|---|---|
| 4,074,318 | 2/1978 | Kapes, Jr. | 358/302 X |
| 4,253,102 | 2/1981 | Kataoka et al. | 346/108 |
| 4,383,262 | 5/1983 | Noguchi | 346/108 X |
| 4,553,148 | 11/1985 | Behrens et al. | 346/107 R |
| 4,775,896 | 10/1988 | Umeda et al. | 358/298 |
| 4,897,672 | 1/1990 | Horiuchi et al. | 346/107 R |
| 4,928,122 | 5/1990 | Doi et al. | 346/160 |
| 4,956,684 | 9/1990 | Urata | 357/17 |

FOREIGN PATENT DOCUMENTS 0398422 of 0000 European Pat. Off. .

OTHER PUBLICATIONS

IBM Technical Disclosure Bulletin, "Light-Emitting GaAs Diode", by M. Michelitsch, vol. 8, No. 11, Apr. 1966.

*Primary Examiner*—Benjamin R. Fuller
*Assistant Examiner*—David Yockey
*Attorney, Agent, or Firm*—Spensley Horn Jubas & Lubitz

[57] ABSTRACT

A light emitting region of light emitting elements is so configured as to extend in an elongated fashion along the direction of movement of a photosensitive drum to prevent the area of exposure in the direction of movement of the drum from becoming unreasonably small. The width of the light emitting region of the light emitting elements is reduced to restrain unreasonable expanse of emitted light beams. Further, arrangement is made to provide greater current density thereby to obtain increased light intensity, and the distribution of current is equalized to provide uniform light brightness. Through development of finer and more intense light beams in this way, it is possible to inhibit unreasonable expanse of light beams thereby to enable each single light emitting diode to provide sufficient exposure intensity. Thus, the width of continuously printed lines, the width of intermittently printed lines, and the diameter of each dot in one dot printing can be substantially equalized. Therefore, the optical printer head according to the invention provides for good improvement in print equality.

21 Claims, 8 Drawing Sheets

Fig.8
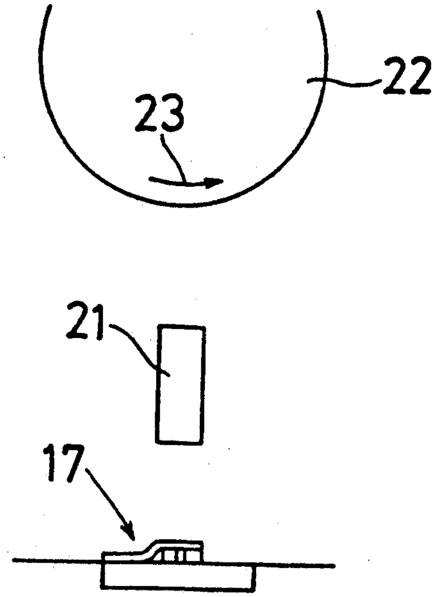
Fig.9(1)
Fig.9(2)
Fig.9(3)
Fig.9(4)
Fig.9(5)
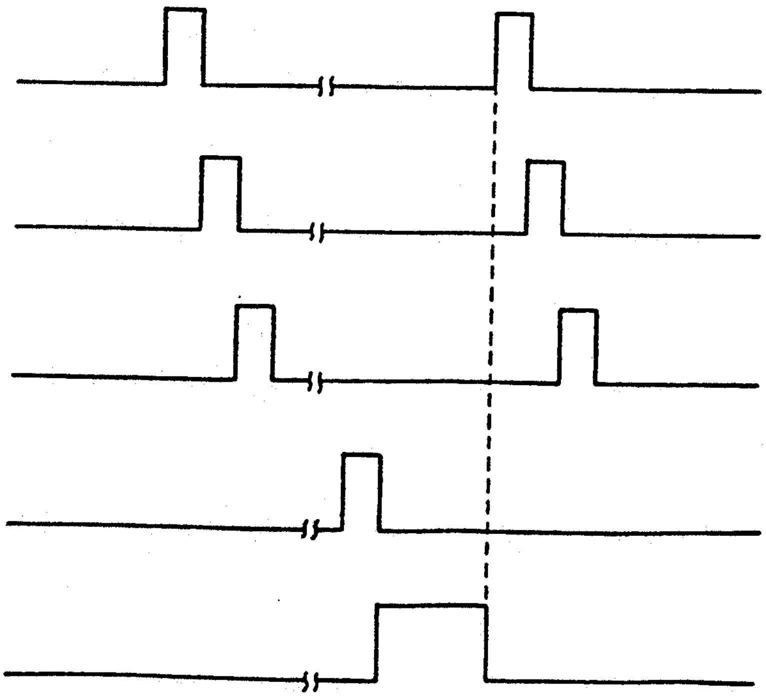

OPTICAL PRINTER HEAD

BACKGROUND OF THE INVENTION

1. Field of the Invention

The present invention relates to an optical printer head and, more particularly, to the arrangement of light emitting elements provided in the optical printer head.

2. Description of the Prior Art

In optical printer heads, a plurality of light emitting diodes may be arranged in rows in a manner that light beams from the light emitting diodes converge in a selfoc lens array to form a latent electrostatic image on a right circular cylinder-shaped photosensitive drum which has previously been electrostatically charged. Each light emitting diode 1 has an electrode 2 to which power is supplied to cause a light emitting region 3 to emit light. The direction of movement of the photosensitive drum is perpendicular to the orientation of the light emitting diodes 1 (vertical direction in FIG. 1(1)) as indicated by an arrow 4.

A brightness profile of the light emitting diode 1 taken along a line B1—B1 which is in parallel to the direction of drum movement 4 is illustrated in FIG. 1(2), and a brightness profile of the light emitting diode 1 taken along a line A1—A1 which is transverse to the direction of drum movement 4 is illustrated in FIG. 1(3). A developed dot to be formed on the photosensitive drum as a result of light emission from the light emitting diode 1 is represented by reference numeral 5 in FIG. 1(4). A light beam emitted from the light emitting region 3 of the light emitting diode 1 passes through a selfoc lens array (not shown) which is disposed between the light emitting diode 1 and the photosensitive drum and forms an image on the photosensitive drum. In FIG. 1(5), there is shown a light intensity profile of the light beam which has passed through the selfoc lens array and which is taken in a direction parallel to the direction of drum movement 4. A light intensity profile transverse to the direction of drum movement 4 is illustrated in FIG. 1(6). As light passes through the selfoc lens array, marginal regions 6, 7 of the brightness profile of the light from the light emitting region 3 of the light emitting diode 1 are significantly lowered into minor margins 8, 9.

In a conventional optical printer head of such arrangement, as FIG. 2(1) illustrates, the light emitting diodes 1 are driven to effect light emission from their light emitting regions 3. Scanning along a horizontal scanning direction or along the orientation of the rows of the light emission diodes is repeated, for example, at intervals of time period T1. As a result of the rotation of the photosensitive drum in a vertical scanning direction perpendicular to the horizontal direction and the repeated light emission from the light emission diodes, latent images of lines are formed on the photosensitive drum in the vertical scanning direction. FIG. 2(2) shows a latent image of a continuous line having a width W1 which is formed in the vertical scanning direction on the photosensitive drum by one of the light emission diodes. The line having the width W1 is thereafter transferred onto a transfer paper.

When the light emitting diodes 1 are driven at interval of time period T2, for example, in order to effect intermittent printing, as illustrated in FIG. 3(1), a line having a width W2 which is narrower than the width W1 in the case of continuous printing is printed in transfer paper as shown in FIG. 3(2), whose image is found to be sporadically broken.

When one dot only is to be printed, the light emitting diodes 1 are driven to emit light thereby to effect printing on transfer paper in manner as shown in FIG. 4(2). The printed dot is found to be out of shape when compared with the light emitting region 3 of the light emitting diodes 1. For the purpose of printing such one dot, the light emitting diodes are driven at time intervals T3 as shown in FIG. 4(1).

Reasons why continuous printing and intermittent printing results in such different print line widths W1, W2, and why one dot printing involves such deformation in print configuration will be explained. When light from each light emitting diode 1 passes through the selfoc lens array to form an image on the photosensitive drum, the light is decayed by the selfoc lens. For example, a certain selfoc lens array can reduce the light intensity to as low as about 1/5 thereof. Further, the intensity profile of the light which has just passed the selfoc lens array is such that, as already stated, the light intensity of the marginal region is significantly lowered. In addition, where the photosensitive drum is in rotation while a latent electrostatic image is being written on the drum, the light from the light emitting diode does not focus on one point and, if the duration of light emission is short, the trouble is that writing energy is insufficient. The profile of such reduced light intensity on the photosensitive drum involves the following problems at time of printing, as FIG. 5 illustrates. In the case of continuous printing, as FIG. 5(1) shows, the presence of marginal regions 8 (FIG. 1(5)) and 9 (FIG. 1(6)) in the intensity profile of light beams 10 from the light emitting diode 1, coupled with the fact that light emitting time interval Ti is short, causes overlapping of emitted light beams 10 in a similar manner as in the case of light emission being effected for a longer period of time. As a result of the repeated overlapping of the light beams, the light beams form a latent image of a continuous line 11 having a large width on the photosensitive drum which is printed accordingly on the transfer paper.

In the case of intermittent printing, as FIG. 5(2) shows, there develops a smaller degree of overlapping of emitted light beams 12 than in the case of continuous printing, with the result that a continuous line 13 of a smaller width than in the case of continuous printing is written as a latent image on the photosensitive drum.

In the case of one dot printing, as FIG. 5(3) shows, no overlapping effect occurs between an emitted light beam 14 and other adjacent light beams, and accordingly the resulting print dot 15 is diametrically smaller. After light beams from individual light emitting diodes have passed through the selfoc lens array, marginal regions 8, 9 of the intensity profile of the light beams are already lower in their intensity as earlier stated in conjunction with FIGS. 1(5) and 1(6), and therefore the energy available for exposure of the photosensitive drum is insufficient. Furthermore, since the photosensitive drum is in rotation, the light from the light emitting diodes does not focus on one point. This is another cause of the insufficiency of exposure energy.

The above mentioned problems of the prior art arrangement as explained with reference to FIGS. 1 to 6 are largely accounted for by the configuration of the light emitting region 3 of each light emitting diode. In the light emitting diode 1 shown in FIG. 1(1), the current for driving it flows at a large current density in the proximity of the electrode 2 and, as the current flows away from the electrode 2, rightward in FIG. 1(1), the density of the current is abruptly reduced so that as already mentioned, the brightness profile of the light from the light emitting diode 1 is as shown in FIG. 1(2) wherein the brightness of the marginal region 6 is considerably lower than that in the proximity of the electrode 2. Such reduced brightness of the marginal region 6 is attributable to the configuration of the light emitting diode 1. This phenomenon is particularly apparent when light from the light emitting region 3 of the light emitting diode 1 has passed through the selfoc lens array. That is, as can be seen from FIG. 1(4), the width of the emitted light beam 5 becomes smaller and, especially in the case of one dot printing, each print dot is extremely small in its diametrical size.

FIG. 6 shows the relationship between input energy of light emitting diodes as one part and breadth of distribution of light beam brightness and print line width as the other part. The light emitting diodes 1 are arranged in a dot density of 300 dots/inch. Line l1 represents the breadth of the brightness distribution of a light emitting region 3; line l2 represents line width W in the case of continuous printing; and line l3 represents dot width W3 in the case of one dot printing.

It can be seen that in the case of continuous printing a large line width can be obtained when the input energy is low, as line l2 indicates, whereas in the case of one dot printing the diameter of each dot print is not so large as that in the case of continuous printing. In order to obtain a larger diameter of a dot, which is comparable to the continuous print line, a large input energy has to be applied as shown in FIG. 6. A comparison between line l1 indicative of the breadth of the brightness distribution and line l2 indicative of the width of continuous print line shows that there is a difference of 4 to 5 times, that is, the latter is 4 to 5 times larger than the former. The reason for this is that the width of emitted light beam is increased before the light beam from each light emitting diode reaches the surface of the photosensitive drum, and that overlapping of emitted light beams in continuous printing results in increased print line width.

In summary, printing by using the prior art arrangement of light emitting diodes 1 involves that problem that the resulting print lines and dots differ in width and diameter according to the cyclic period of printing, such as continuous printing, intermittent printing, or one dot printing. In the case of one dot printing in particular, no dot diameter W3 can be obtained at the required value. Therefore, with the prior art arrangement, the problem of print quality degradation is unavoidable.

SUMMARY OF THE INVENTION

The object of the invention is to provide an optical printer head which affords improvement in print quality.

The invention provides an optical printer head of the type in which light beams from a plurality of light emitting elements arranged in a row are illuminated onto a photosensitive drum to form a latent electrostatic image thereon, characterized in that a light emitting region of each of the light emitting elements is so configured as to extend in an elongated fashion along the direction of rotational movement of the photosensitive drum.

In the invention, the length of the light emitting region extending along the direction of movement of the photosensitive drum is set in the range of 70 to 130% of a distance of rotational movement of the photosensitive drum in the vertical scanning direction between two adjacent horizontal scanning lines, which is herein defined as a vertical scanning pitch.

In the invention, the light emitting region is divided into parts in the direction of rotational movement of the photosensitive drum.

Further, in the invention, the width of the light emitting region is set in the range of 30 to 50% of the distance of rotational movement of the photosensitive drum in the vertical scanning direction between two adjacent horizontal scannings.

Furthermore, in the invention, each light emitting element has an electrode disposed centrally of the width of its light emitting region.

According to the invention, in an optical printer head in which light beams from a plurality of light emitting elements arranged in a row are illuminated onto a photosensitive drum rotating in the vertical scanning direction which is transverse to the row of light emitting elements to thereby form a latent electrostatic image on the photosensitive drum, the light emitting region of each of the light emitting elements is so configured as to extend in an elongated fashion along the direction of rotational movement of the photosensitive drum.

Thereby, the area of exposure in the direction of movement of the photosensitive drum can be prevented from becoming smaller, and in addition the width of the each of light emitting elements, that is, the width of each of the light emitting elements in the horizontal scanning direction in which they are arranged is reduced to thereby restrain the expanse of emitted light beams in the horizontal scanning direction so that undesired approach of light beams from adjacent light emitting elements can be prevented.

Further, according to the invention, the plurality of light emitting elements are sequentially driven in the direction of their orientation for horizontal scanning, and for each such scanning the photosensitive drum is moved a predetermined distance in a direction perpendicular to the row of the light emitting elements to effect vertical scanning. For this purpose, the length of the light emitting region extending along the direction of movement of the photosensitive drum is set within the range of 70 to 130% of the distance of movement of the photosensitive drum for vertical scanning between two adjacent horizontal scannings. Therefore, the light emitting region is not unreasonably elongated to an extent that a difference between the width of each line and the diameter of one dot can be prevented from becoming excessively large.

According to the invention, the light emitting region is divided into parts along the direction of movement of the photosensitive drum, and the width of the light emitting region is set within the range of 30 to 50% of the distance of movement of the photosensitive drum for vertical scanning between two adjacent horizontal scannings, whereby the widthwise expanse of emitted light beams can be reasonably restrained.

Again, according to the invention, the current density of the light emitting elements is set at 770 to 810 $mA/cm^2$ and, by virtue of such high current density setting, increased light intensity can be obtained.

By setting the width of the light emitting region within 30 to 50% of the distance of movement of the photosensitive drum as above mentioned, it is possible to prevent any unreasonable increase in line width during continuous printing.

Further, according to the invention, an electrode is disposed centrally of the width of each light emitting region, whereby the current density distribution in the light emitting region can be equalized. Accordingly, it is possible to obtain a uniform light intensity profile, and thus to sharpen the slope of the marginal region of the light intensity profile to emit light beam proximate to the configuration of the light emitting region, with the result that the width of each line in the case of continuous printing and the diameter of each dot in the case of one dot printing can be substantially equalized.

In this way, according to the basic concept of the invention, by arranging so that finer and more intense light beams are emitted by the light emitting elements, it is possible to restrain any unreasonable expanse of emitted light beams and to obtain sufficient exposure intensity from a single light emitting element, so that the width of each line during continuous printing and the diameter of each dot during one dot printing are substantially equalized thereby to afford improvement in print quality.

As above explained, according to the invention the light emitting region of the light emitting elements is so configured as to extend in an elongated fashion along the direction of movement of the photosensitive drum thereby to prevent any unreasonable decrease in the area of exposure in the direction of movement of the drum. Further, the width of the light emitting region of the light emitting elements is reduced to restrain possible expanse of emitted light beams. Again, the distribution of current is uniform so as to equalize the distribution of light brightness. In this way, finer and more intense light beams are developed to inhibit any unreasonable light beam expanse, whereby the width of each line during continuous printing, the width of each line during intermittent printing, and the diameter of each dot during one dot printing are substantially equalized, it being thus possible to obtain improved print quality.

BRIEF DESCRIPTION OF THE DRAWINGS other and further objects, features, and advantages of the invention will be more explicit from the following detailed description taken with reference to the drawings wherein:

FIG. 1(2) is a brightness profile of the light beam of the light emitting diode as shown in FIG. 1(1) in the vertical scanning direction;

FIG. 1(3) is a brightness profile of the light beam of the light emitting diode as shown in FIG. 1(1) in the horizontal scanning direction;

FIG. 1(4) is a view of a dot of the light beam formed on a photosensitive drum;

FIG. 1(5) is a brightness profile of the light beam on the photosensitive drum in the vertical scanning direction;

FIG. 1(6) is a brightness profile of the light beam on the photosensitive drum in the horizontal scanning direction;

FIG. 2(2) is a view of a line formed on the photosensitive drum in the vertical direction in continuous printing;

FIG. 3(2) is a view of a line formed on the photosensitive drum in the vertical direction in intermittent printing;

Figure 1:
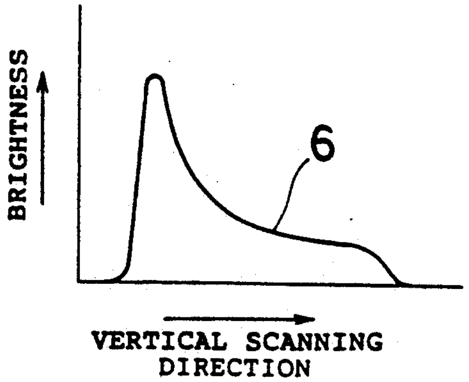
Fig.1(2) (PRIOR ART)
FIG. 1(1) is a schematic plan view of a light emitting diode of the prior art for emitting a light beam.
Figure 1:
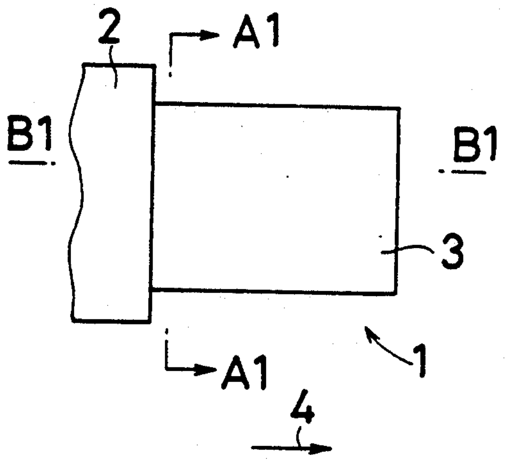
Fig.1(1) (PRIOR ART)
Figure 1:
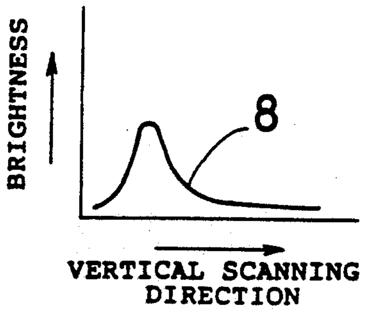
Fig.1(5) (PRIOR ART)
Figure 1:
Fig.1(4) (PRIOR ART)
Figure 1:
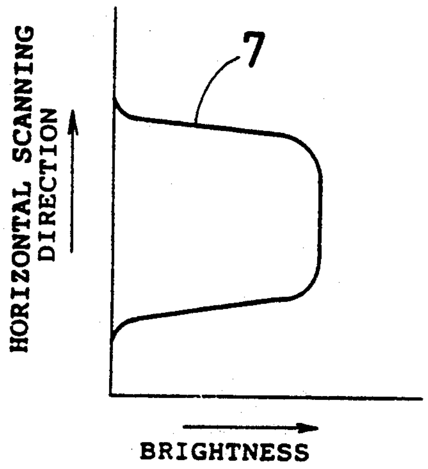
Fig.1(3) (PRIOR ART)
Figure 1:
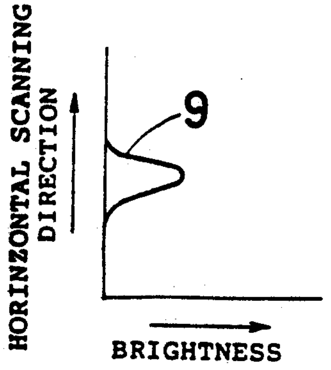
Fig.1(6) (PRIOR ART)
Figure 2:
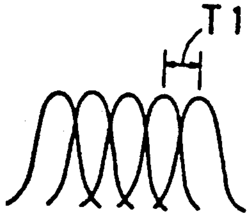
Fig.2(1) (PRIOR ART)
FIG. 2(1) is a view of overlapped light beams emitted from the light emitting diode as shown in FIG. 1(1) in the vertical direction in continuous printing.
Figure 2:
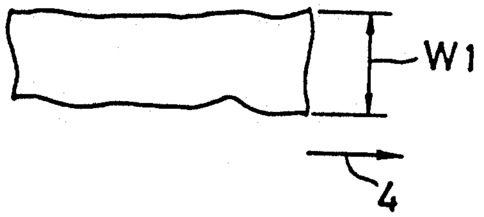
Fig.2(2) (PRIOR ART)
Figure 3:
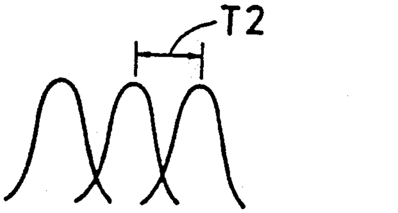
Fig.3(1) (PRIOR ART)
FIG. 3(1) is a view of overlapped light beams emitted from the light emitting diode as shown in FIG. 1(1) in the vertical direction in intermittent printing.
Figure 3:
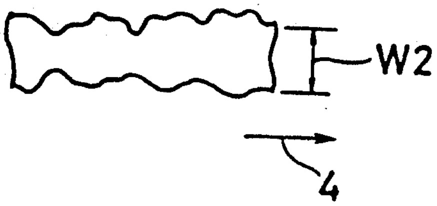
Fig.3(2) (PRIOR ART)
Figure 4:
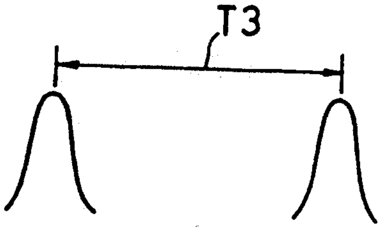
Fig.4(1) (PRIOR ART)
Figure 4:
Fig.4(2) (PRIOR ART)
Figure 5:
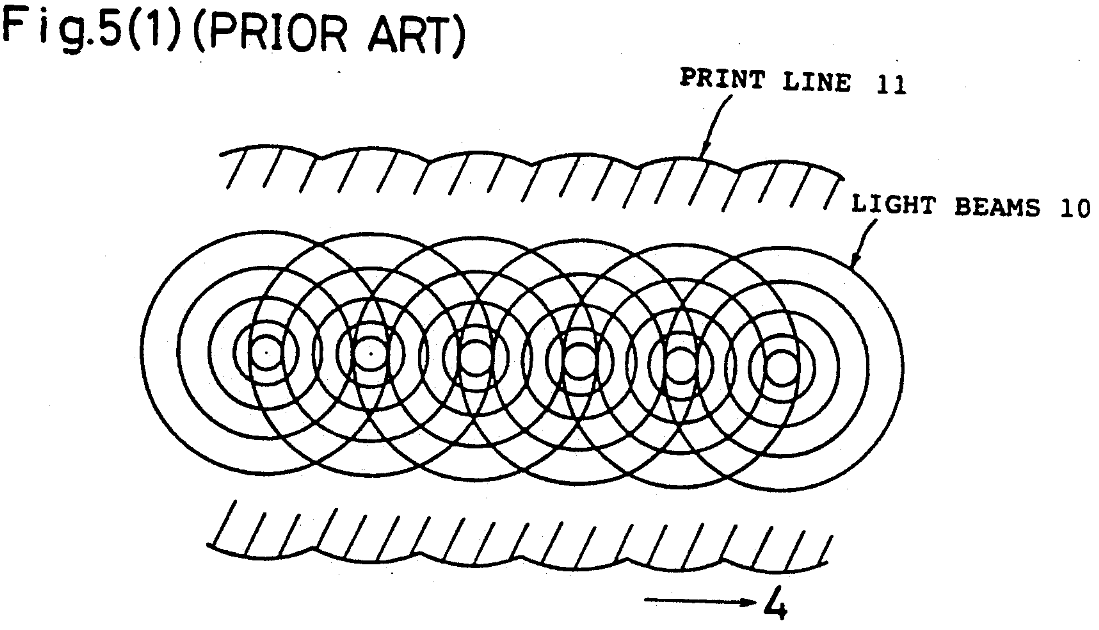
Fig.5(1) (PRIOR ART)
Figure 5:
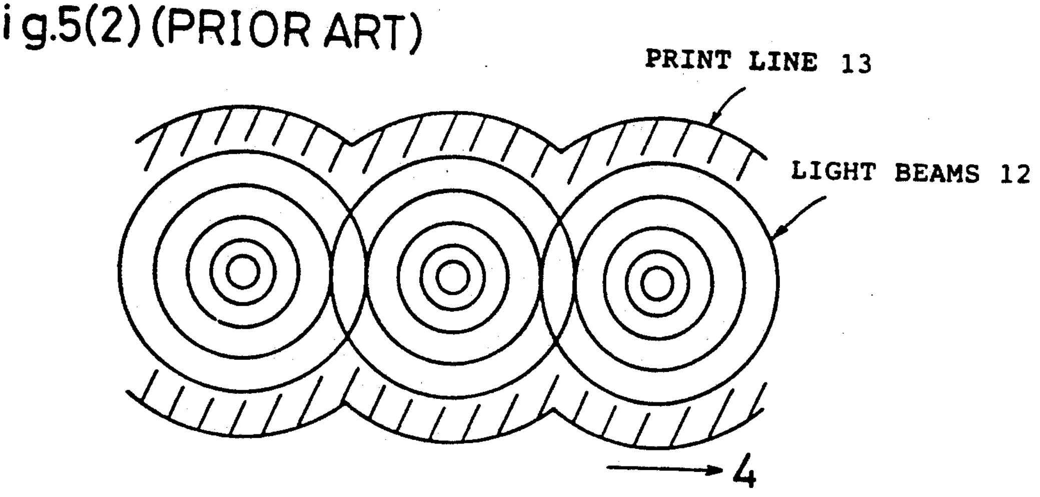
Fig.5(2) (PRIOR ART)
Figure 5:
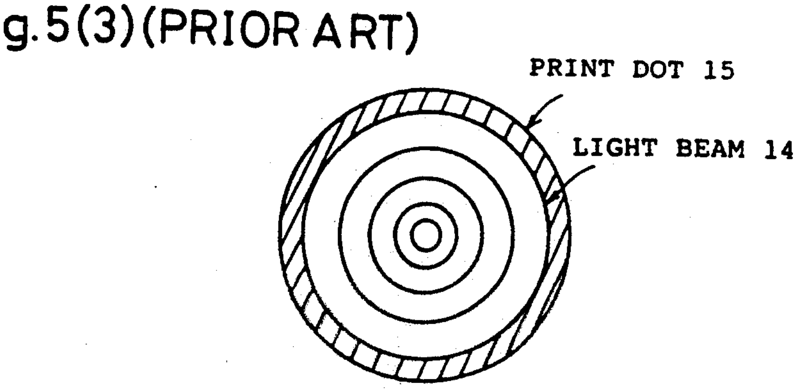
Fig.5(3) (PRIOR ART)
Figure 6:
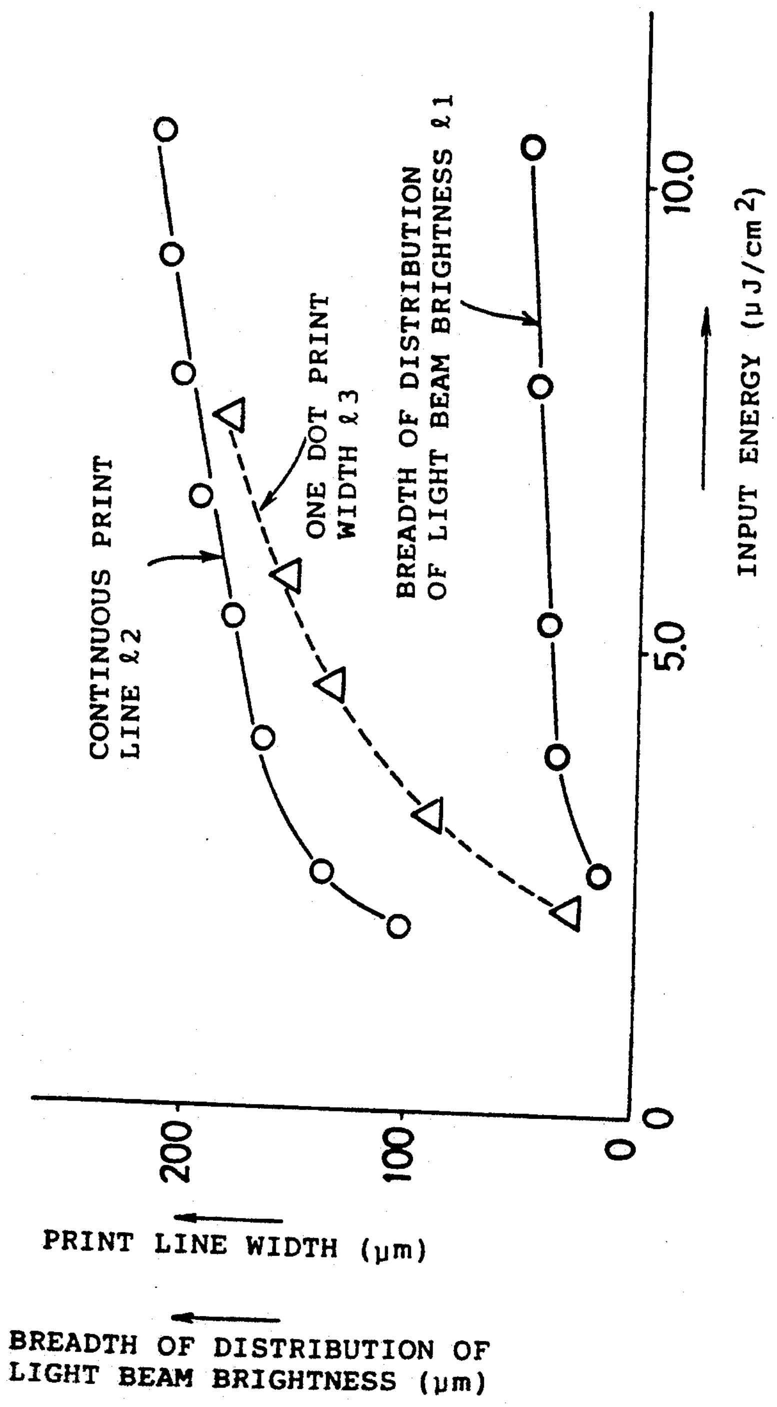
Fig. 6 (PRIOR ART)
Figure 7:
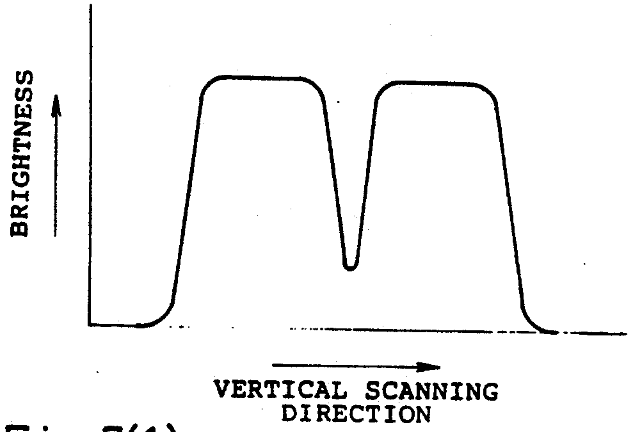
Figure 7:
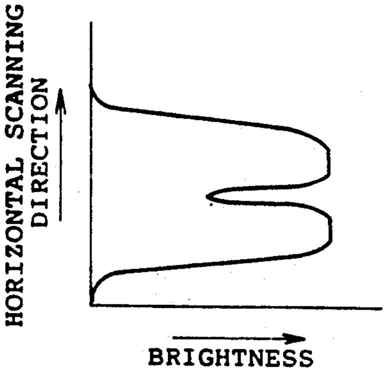
Figure 7:
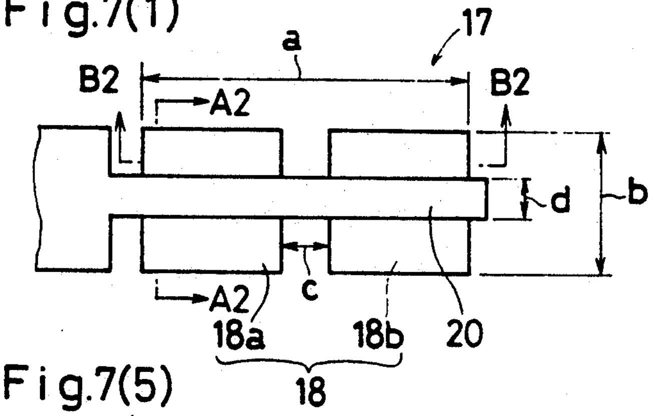
Figure 7:
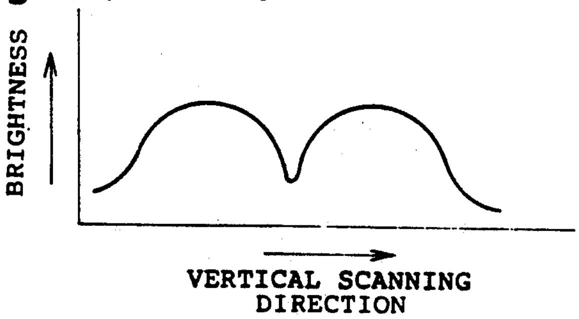
Figure 7:
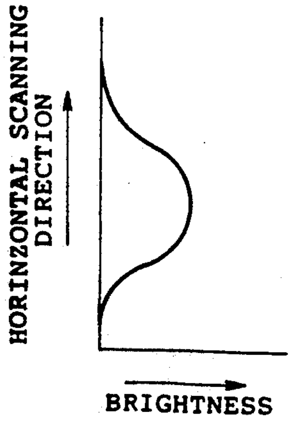
Figure 7:
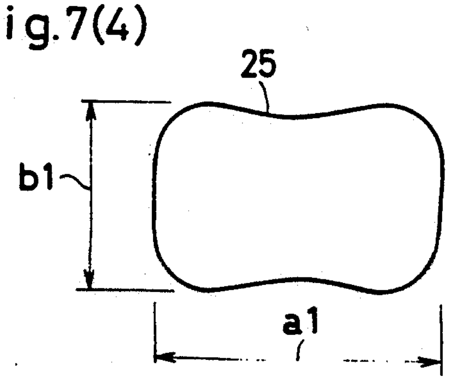
Figure 10:
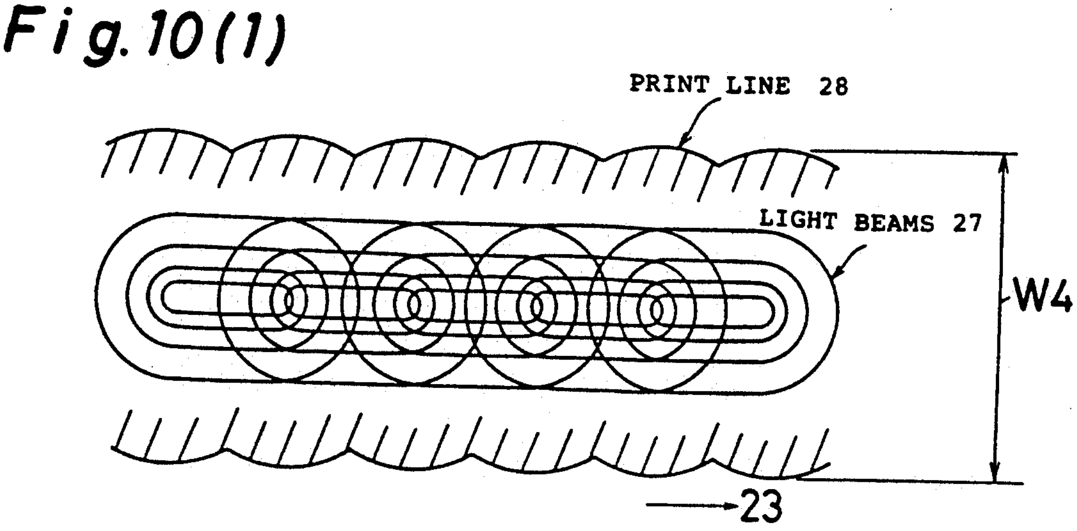
Figure 10:
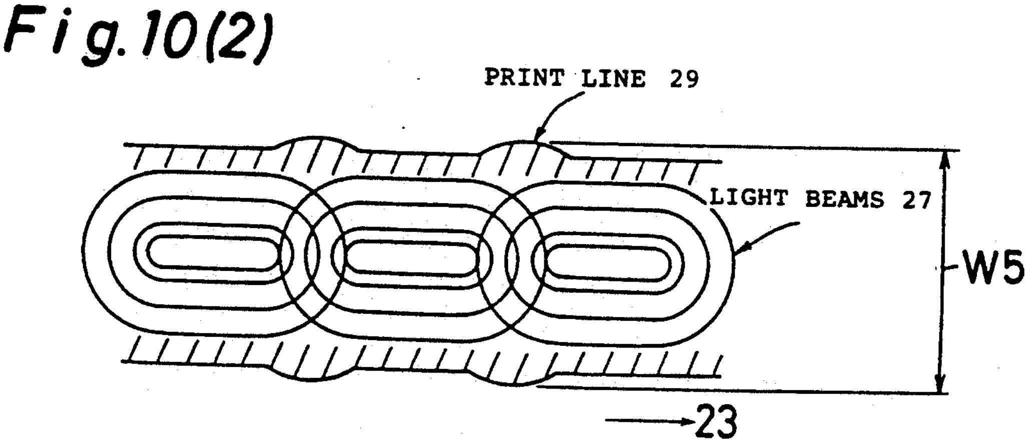
Figure 10:
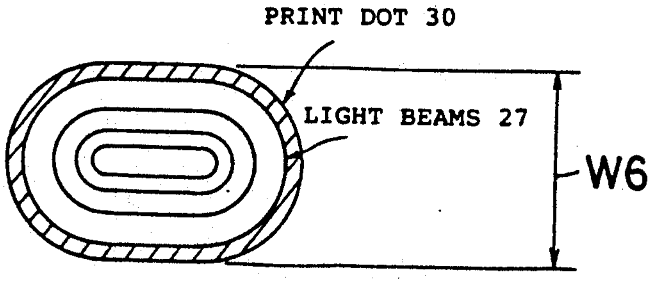
Figure 11:
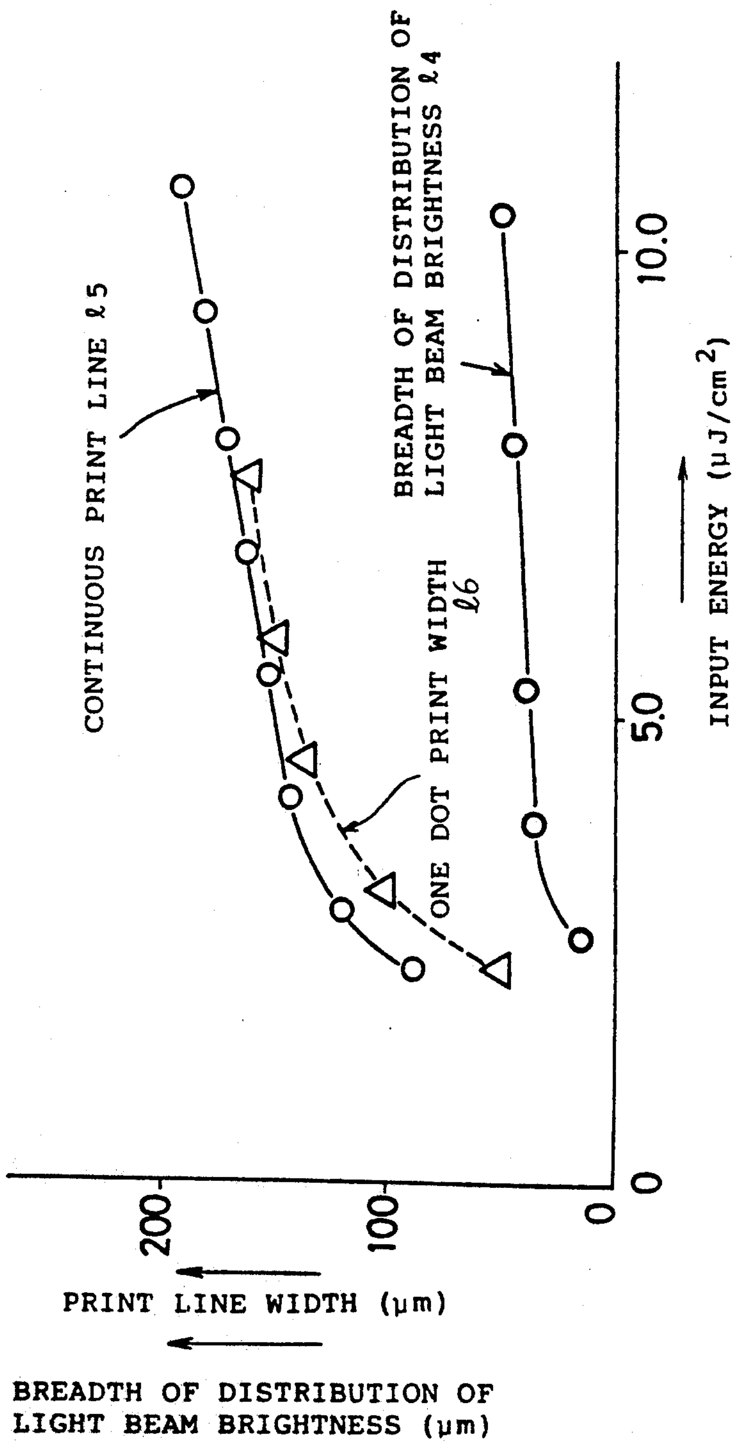

FIG. 4(1) comprises spaced light beams emitted from the light emitting diode as shown in FIG. 1(1) in the vertical direction in one dot printing;

FIG. 4(2) is a view of dots formed on the photosensitive drum in the vertical direction in one dot printing;

FIG. 5(1) is a view of a line formed on the photosensitive drum in the vertical direction by overlapped light beams which are emitted from the light emitting diode as shown in FIG. 1(1) in continuous printing;

FIG. 5(2) is a view of a line formed on the photosensitive drum in the vertical direction by overlapped light beams in intermittent printing;

FIG. 5(3) is a view of a dot formed on the photosensitive drum by a light beam in one dot printing;

FIG. 6 is a graph showing light beam brightness distribution characteristics of the prior art arrangement of FIG. 1;

FIG. 7(1) is a schematic plan view of a light emitting diode for emitting a light beam in accordance with one embodiment of the present invention;

FIG. 7(2) is a brightness profile of the light beam of the light emitting diode as shown in FIG. 1(1) in the vertical scanning direction;

FIG. 7(3) is a brightness profile of the light beam of the light emitting diode as shown in FIG. 1(1) in the horizontal scanning direction;

FIG. 7(4) is a view of a dot of the light beam formed on a photosensitive drum;

FIG. 7(5) is a brightness profile of the light beam on the photosensitive drum in the vertical scanning direction;

FIG. 7(6) is a brightness profile of the light beam on the photosensitive drum in the horizontal scanning direction;

FIG. 8 is a schematic side elevational view showing an optical printer equipped with the light emitting diodes 17 representing one embodiment of the invention;

FIG. 9 is a view explanatory of horizontal scanning of the light emitting diodes 17 and vertical scanning of a photosensitive drum 22;

FIG. 10(1) is a view of a line formed on the photosensitive drum in the vertical direction by overlapped light beams which are emitted from the light emitting diode as shown in FIG. 7(1) in continuous printing;

FIG. 10(2) is a view of a line formed on the photosensitive drum in the vertical direction by overlapped light beams in intermittent printing;

FIG. 10(3) is a view of a dot formed on the photosensitive drum by a light beam in one dot printing;

FIG. 11 is a graph showing light beam brightness distribution characteristics of the present invention.

DETAILED DESCRIPTION OF THE PREFERRED EMBODIMENTS

Now referring to the drawings, preferred embodiments of the invention are described below.

FIG. 7 illustrates one embodiment of the invention. In an optical printer head, a plurality of light emitting diodes 17, each having a plan view configuration as shown in FIG. 7(1), are arranged in a row along the direction of the horizontal scanning, for example, in a dot density of 300 dots/inch. Each of the light emitting diodes 17 has a light emitting region 18 and a separate electrode 20.

FIG. 8 is a schematic side elevational view showing an optical printer equipped with light emitting diodes 17. Light from the light emitting region 18 of each light emitting diode 17 is illuminated through a selfoc lens 21 onto a right-circular photosensitive drum 22 to form an image thereon. The photosensitive drum 22 is driven in the direction of arrow 23 and subjected to precharging. Exposure is effected by the light passing through the selfoc lens 21 to form a latent electrostatic image onto the photosensitive drum. The latent electrostatic image is developed by toner and later transferred onto transfer paper. Each transfer paper sheet to which a toner image has been transferred is fixed. The direction of movement 23 of the photosensitive drum 22 is transverse to the row of the light emitting diodes 17 (which are arranged in the horizontal scanning direction). The plurality of light emitting diodes 17 is sequentially driven, one by one, in the order of their arrangement to emit light thereby to effect horizontal scanning. After each horizontal scanning, the photosensitive drum 22 is moved at a predetermined pitch in the direction 23 of its movement in manner as shown in FIG. 9(5) for the purpose of vertical scanning. Subsequently, the light emitting diodes 17 are again subsequently driven for a next cycle of horizontal scanning. Printing is carried out in this manner.

By way of example, a certain construction of one light emitting diode 17 will be explained. An n-type second semiconductor layer consisting of GaAsP is first grown on an n-type first semiconductor layer consisting of GaAs, then a mask layer consisting of $Si_3N_4$ or $SiO_2$ is formed on the surface of the second semiconductor layer. The mask layer is formed with an opening for next doping. A p-type third semiconductor layer is then formed by diffusing Zn, for example, into a portion of the second semiconductor layer through the opening. Thus, by virtue of the p-type third semiconductor layer and the second semiconductor layer, a pn junction is provided. A common electrode for a plurality of light emitting diodes is provided in the n-type semiconductor layer, and separate electrodes 20 are provided in the p-type third semiconductor layer. When a voltage is applied between the common electrode and each of the separate electrodes 20, light is emitted at the pn junction. A portion corresponding to the pn junction represents the foregoing light emitting region 18. A brightness profile of light beams from the light emitting diodes 17 taken along line B2—B2 parallel to the direction of rotational movement 23 of the photosensitive drum 22 in FIG. 7(1) is shown in FIG. 7(2), and a brightness profile taken along line A2—A2 perpendicular to the direction of movement 23. A light beam emitted from each of the light emitting diodes 17 is focused onto the photosensitive drum 22 through a selfoc lens array 21, and a latent electrostatic image thus formed on the drum or, in other words, the configuration of a print dot printed on transfer paper is shown by reference numeral 25 in FIG. 7(4). As shown, such a dot has an elongated shape in the direction of rotational movement 23. FIG. 7(5) shows a light intensity profile of a light beam emitted from each of the light emitting diodes 17 on the photosensitive drum 22 along the direction of the rotational movement 23, and FIG. 7(6) shows a light intensity profile of the light beam in the horizontal scanning direction, that is, in a direction transverse to the direction of rotational movement 23.

According to experiments conducted by the present inventor, the length a of the light emitting region 18 taken along the direction of movement 23 was 85 μm, for example, and the width b thereof taken along a line transverse to the direction of movement 23 is 35 μm.

Each light emitting region 18 is divided at the interval c along the direction of movement 23 to form light emitting regional parts 18*a*, 18*b*. Each part 18*a*, 18*b* of the light emitting region has a square or rectangular configuration. The division of the light emitting region 18 into two parts 18*a*, 18*b* in this way provides for improvement in current density with respect to the two parts 18*a*, 18*b*. The current density is selectable within the range of 770 to 830 $mA/cm^2$ whereby improved light beam intensity can be suitably obtained.

The length a of the light emitting region 18 taken along the direction of movement 23 is set within the range of 70 to 130% of the earlier mentioned pitch of movement of the photosensitive drum 22 or the distance of movement thereof. The term pitch of movement or distance of movement referred to herein means the distance of movement of the photosensitive drum 22 to be made for vertical scanning in the direction of movement 23, that is, in a direction perpendicular to the row of light emitting elements 17 for each sequential horizontal scanning of the light emitting elements 17. This distance of movement may be 84 to 85 μm, for example.

The width b of the light emitting region 18 is set, for each horizontal scanning of the row of light emitting elements 17, in the range of 30 to 50% of the above mentioned distance of movement of the photosensitive drum 22 for vertical scanning.

By setting the length a and width b of the light emitting region 18 in the foregoing ranges in this way, it is possible to prevent any unreasonable increase in the width of each printed line during continuous printing, and yet attain an optimum current density as stated above. Furthermore, it is possible to prevent any undesired expanse of the width of emitted light beams in corresponding relation to the configuration of the light emitting region 18. Any unreasonable increase in the width of each print line during intermittent printing can be prevented as well as in the case of continuous printing. For the purpose of one dot printing, as already explained in conjunction with FIG. 7, the length a1 and width b1 of each print dot 25 can be prevented from becoming smaller. This is because any decay of light beams after their passage through the selfoc lens array 21 can be minimized and, at the same time, any insufficiency of an exposure energy due to the rotation of the photosensitive drum 22 can be prevented. As a result, a substantially improved print dot configuration is obtainable in the case of one dot printing.

The manner of printing as achieved in this way will now be explained with reference to FIGS. 10(1)–10(3). FIG. 10(1) shows a print line 28 formed by light beams 27 emitted from the light emitting diode 17 when driven to carry out continuous printing. Light beams 27 emitted from the light emitting region 18 are in partially overlapping relation and accordingly print lines 28 are formed on transfer paper, with line width W4 restrained in manner as earlier stated.

The condition of intermittent printing in which light emitting diodes 17 are driven in alternate horizontal scanning intervals is shown in FIG. 10(2). With light beams emitted from the light emitting region of light emitting diodes 17, print lines 29 are formed on the photosensitive drum 22 and accordingly on transfer paper. In this case as well, the width W5 of each print line 29 is prevented from becoming unreasonably large.

When a single light emitting diode 17 is driven for horizontal scanning, as FIG. 10(3) shows, a light beam 27, and accordingly a print dot 30 is obtained. This print dot 30 is not unreasonably small and has a width W6 corresponding to the configuration of the light emitting region 18. Thus, width W4, W5 of print lines 28, 29 and width W6 or dot diameter of print dot 30 can be substantially equalized thereby to obtain improved print quality.

The electrode 20 of each light emitting diode 17 is disposed centrally of the light emitting region 18 thereof (i.e., a vertically median position in FIG. 7(1)). Therefore, the current density at light emitting regional parts 18*a*, 18*b* can be maintained reasonably high so as to equalize the distribution of the current density. Therefore, the brightness profile of light beams emitted from the regional parts can be made free of any unreasonable offset in the direction of movement 23 of the photosensitive drum 22 as shown in FIG. 7(2), and likewise the brightness profile of light beams in a direction perpendicular to the direction of movement 23 can be made free from any unreasonable offset as shown in FIG. 7(3). Accordingly, light beams can be emitted from the light emitting region 18 at a generally uniform rate of brightness.

FIG. 11 is a graph showing the results of experiments conducted by the inventor which shows the breadth of the brightness distribution with respect to light beams from light emitting diode 17 and the width of one-dot print, as against input energy of light emitting diode 17. Line 14 represents the breadth of light beam brightness distribution, line 15 represents line width W4 in the case of continuous printing, and line 16 represents dot diameter or width W6 in the case of one dot printing.

In the case of continuous printing, as can be seen from line 15, line width already takes a large value when the input energy is still low; and moreover line width W4 is smaller as compared with line 12 in FIG. 6, in corresponding relation to the decrease in the width b of the light emitting region 18. Again, as can be observed from line 16, line width in the case of one dot printing is already large when the input energy is still low. Thus, it has been confirmed that the difference between line width W4 in the case of continuous printing and line width W6 in the case of one dot printing can be satisfactorily reduced.

According to the invention, in place of the light emitting diode any light emitting element of other suitable structure may be used. In the foregoing embodiment, the light emitting region 18 of each light emitting diode 17 is divided into two light emitting parts 18*a*, 18*b*; but in one alternative the light emitting region 18 may be divided into three or more parts. In another alternative, the light emitting region may be a single, undivided elongated light emitting region.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

We claim:

1. In an optical printer head having a plurality of light emitting elements arranged in a row and responsive to drive currents for scanning a rotatable photosensitive drum to form a latent electrostatic image thereon, the improvement wherein each of said light emitting elements has a light emitting region which is elongated a predetermined length extending along a direction of rotational movement of said photosensitive drum, each of said light emitting elements further has electrode means for applying a drive current to each region so that a light intensity profile of a light emitted by each region is substantially uniform both along and transverse to the direction of rotational movement of said photosensitive drum.

2. An optical printer head as claimed in claim 1, wherein said row of light emitting elements are arranged along an orientation transverse to a direction of rotation of said photosensitive drum to define a horizontal scanning direction and the direction of rotation of said photosensitive drum defines a vertical scanning direction and perpendicular to the row of light emitting elements, wherein the drum may be scanned in the horizontal scanning direction by sequentially activating the light emitting elements and the drum may be scanned in the vertical scanning direction by rotating the drum as the light emitting elements are activated, and each of said light emitting regions has a length along the direction of rotation movement of the photosensitive drum which is set, for each scanning of the light emitting elements in the horizontal scanning direction, in a range of 70 to 130% of scanning in the vertical scanning direction.

3. An optical printer head as claimed in claim 1, wherein said light emitting region of each of said light emitting elements is divided into sections in the direction of rotational movement of said photosensitive drum.

4. An optical printer head as claimed in claim 1, wherein said row of light emitting elements are arranged along an orientation transverse to a direction of rotation of said photosensitive drum to define a horizontal scanning direction and the direction of rotation of said photosensitive drum defines a vertical scanning direction perpendicular to the row of light emitting elements, wherein the drum may be scanned in the horizontal scanning direction by sequentially activating the light emitting elements and the drum may be scanned in the vertical scanning direction by rotating the drum as the light emitting elements are activated, and each of said light emitting regions has a width in the direction perpendicular to the direction of rotation of said photosensitive drum which is set, for each scanning of the light emitting elements in the horizontal scanning direction, in a range of 30 to 50% of the distance of movement of the photosensitive drum for scanning in the vertical scanning direction.

5. An optical printer head as claimed in claim 1, wherein said electrode means has an electrode disposed centrally of said light emitting region and along the direction of rotation of the drum.

6. An optical printer comprising:

a rotatable photosensitive drum; and a plurality of light emitting elements arranged in a row along an orientation transverse to a direction of rotation of said photosensitive drum;

said row of light emitting elements being activatable along said orientation to define a horizontal scanning direction and said photosensitive drum being rotatable while one or more light emitting elements is activated to define a vertical scanning direction, each of said light emitting elements having light emitting means for emitting a light intensity profile of light which is substantially uniform both along and transverse to the direction of rotation of said photosensitive drum, said light emitting means including a light emitting region extending in the vertical scanning direction.

7. An optical printer as claimed in claim 6, wherein said light emitting region has a length along the vertical scanning direction ranging from 70 to 130% of an vertical scanning pitch.

8. An optical printer as claimed in claim 6, wherein said light emitting region is divided into sections in the vertical scanning direction.

9. An optical printer as claimed in claim 6, wherein said light emitting region has a width along the horizontal scanning direction ranging from 30 to 50% of the vertical scanning pitch.

10. An optical printer as claimed in claim 6, wherein each said light emitting region has an electrode disposed generally at the center of a width of said light emitting region in the horizontal scanning direction.

11. An optical printer comprising:

a rotatable photosensitive drum; and a row of a plurality of light emitting elements arranged in an orientation transverse to a direction of rotation of said photosensitive drum;

said row of light emitting elements being drivable along said orientation in a horizontal scanning direction for emitting light beams onto said photosensitive drum and said photosensitive drum being rotatable in a vertical scanning direction;

each of said light emitting elements having an elongated light emitting region extending in the vertical scanning direction and having an electrode disposed generally at the center of a width of said light emitting region in the horizontal scanning direction, said light emitting region having a length along the vertical scanning direction ranging from 70 to 130% of a vertical scanning pitch and a width along the horizontal scanning direction ranging from 30 to 50% of the vertical scanning pitch.

12. In an optical printer having a photosensitive drum rotatable about an axis of rotation and a light emitting element for illuminating the drum to form an image thereon, the improvement comprising said light emitting element having a light emitting region being elongated a predetermined length oriented in a direction of rotation of the photosensitive drum, said light emitting element further having electrode means for providing a light intensity profile of a light emitted by the light emitting region to be substantially uniform both along and transverse to the direction of rotation of said photosensitive drum.

13. An optical printer as claimed in claim 12, wherein said electrode means has an electrode extending across said light emitting region in the direction of rotation of the photosensitive drum and disposed generally at a center of said light emitting region and oriented along the direction of rotation of the photosensitive drum.

14. An optical printer as claimed in claim 13, wherein said light emitting region is divided into sections along a line aligned in the direction of rotation of the photosensitive drum.

15. An optical printer as claimed in claim 12, wherein said substantially uniform light intensity has an expansion which substantially conforms to a configuration of said light emitting region.

16. An optical printer as claimed in claim 13, wherein said light emitting element is divided into two sectional elements separated from each other by a predetermined spacing along a line aligned in the direction of rotation of the photosensitive drum.

17. An optical printer as claimed in claim 12, wherein said light emitting region includes a top surface opposing the photosensitive drum, and said electrode means has an electrode which is elongated along the direction of rotation of said photosensitive drum and is electrically connected to the light emitting region substantially only in the center of the light emitting region with respect to the direction transverse to the direction of rotation of said photosensitive drum.

18. An optical printer as claimed in claim 12, wherein said light emitting region includes a top surface opposing the photosensitive drum, and said electrode means has an electrode electrically connected substantially only to the top surface of said light emitting region, said electrode extending across said light emitting region with in the direction of rotation of the photosensitive drum and disposed generally at a center of said light emitting region.

19. An optical printer as claimed in claim 18, wherein said light emitting element is divided into two sectional elements separated from each other by a predetermined spacing along a line aligned in the direction of rotation of the photosensitive drum.

20. An optical printer as claimed in claim 12, wherein said light emitting region includes a top surface opposing the photosensitive drum, and said light emitting means has an electrode means electrically connected substantially only to said top surface for permitting a drive current applied to said light emitting element to enter substantially only through said top surface.

21. An optical printer as claimed in claim 20, wherein said top surface has a central area generally at the center of a width of said light emitting region along a direction transverse to the direction of rotation of said photosensitive drum, and said electrode means has an electrode connected substantially only to said central area in said top surface so that a drive current applied to said light emitting element enters substantially only through said central area in said top surface.

* * * * *